J. L. WOODBRIDGE.
SYSTEM OF ELECTRICAL DISTRIBUTION.
APPLICATION FILED NOV. 25, 1911.
1,147,696.
Patented July 20, 1915.
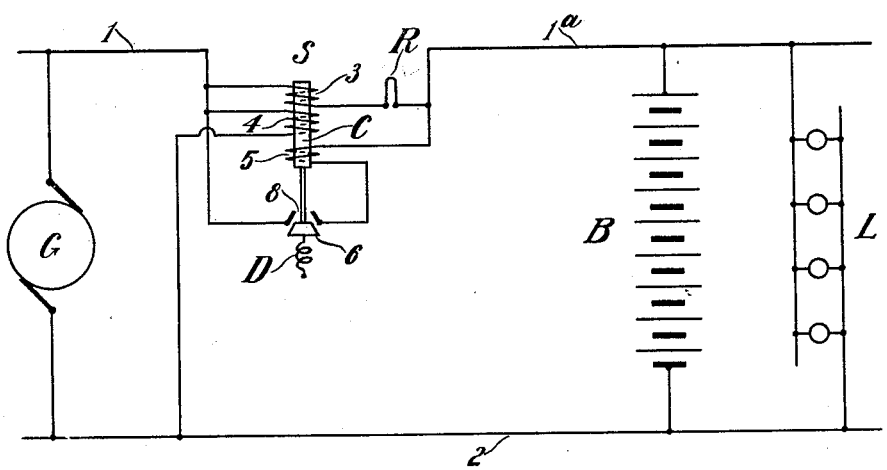
WITNESSES:
INVENTOR
Joseph L. Woodridge
BY
Augustus B. Stoughton,
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,147,696.  Specification of Letters Patent.  Patented July 20, 1915.

Application filed November 25, 1911. Serial No. 662,332.

*To all whom it may concern:*

Be it known that I, JOSEPH LESTER WOODBRIDGE, a citizen of the United States, and a resident of Philadelphia, in the county of Philadelphia and State of Pennsylvania, have invented a certain new and useful System of Electrical Distribution, of which the following is a specification.

This invention relates to systems of electrical distribution in which there are two circuits to each of which is connected a source of electro-motive-force, and the object of the invention is to provide improved automatic means for connecting the two circuits when the electrical conditions on each are suitable for such connection, as for example, when the two electro-motive-forces are substantially equal, and for disconnecting the two circuits when the electrical conditions are unsuitable for such connection, as for example, when the electro-motive-force of one circuit falls below that of the other. One illustration of such a combination is an axle lighting system in which a generator driven at variable speed supplies current for the lights and for charging a storage battery when the speed is above a certain limit, but is disconnected from the lighting circuit which is then fed by the battery when the generator speed drops below that limit.

My invention will be more clearly understood by reference to the following description in connection with the accompanying drawing, in which—

G is a generator connected to the circuit 1—2.

B is a storage battery and L any suitable load circuit, both connected to the circuit $1^a$, 2. The opening between conductors 1 and $1^a$ may be closed by the automatic switch S. This switch consists of a contact piece 6, which may be drawn upward so as to bridge the gap 8 between the conductors 1 and $1^a$ by means of the electromagnet whose core is shown at C, energized by the three coils 3, 4 and 5. The switch is held in the open position by the spring D. As here shown the coil 4 is connected across the terminals of the generator and this coil alone at maximum generator voltage is insufficient to overcome the tension of the spring D. Coil 3 is connected between conductors 1 and $1^a$, and in series with this coil is shown a resistance R having a high temperature coefficient, such as the well known iron wire resistances which have been used in the art for limiting the flow of current beyond a certain value. Coil 3 is wound in a direction to assist coil 4 when the voltage of the generator G is above that of the battery B. Coil 5 is connected in series with conductor $1^a$ and therefore carries the current transmitted between the generator and the battery circuit when the switch S is closed but carries no current when this switch is open. This coil is wound in a direction to assist coil 4 when current is flowing from the generator into the battery and lamp circuit but to oppose coil 4 when this current is reversed. The design of coil 3 and resistance R may be made such that at small differences of voltage between the generator and the battery the coil 3 will have an effect which is a very considerable percentage of the effect of coil 4. For example, when the generator voltage is only 2% greater than that of the battery the effect of coil 3 may be made equal to 25% of that of coil 4, and this effect added to that of coil 4 will be sufficient to close the switch with an ample margin of safety for variation in temperature conditions, friction, etc. If it were not for the resistance R the effect of coil 3 when the generator is shut down would be fifty times as great, since it would then receive 100% of the circuit potential across its terminals instead of 2%. But the resistance R may be so designed as to prevent the current in coil 3 from increasing to more than say four times the amount required in this coil, in conjunction with coil 4, to close the switch. When the generator is shut down, coil 4 will carry no current, while the effect of coil 3 will be only just equal to that of coil 4 at maximum generator voltage which, as noted above, is insufficient, alone, to close the switch.

What I claim and desire to secure by Letters Patent is:

1. In combination, two sources of electro-motive-force, means for connecting them in parallel relation, coils for operating said means whereof one is connected between terminals of the two sources of like polarity, and variable resistance means for limiting without interrupting the flow of current through last mentioned coil.

2. In combination, a source of substantially constant electro-motive-force, a second source of varying electro-motive-force, a switch for connecting them in parallel relation, coils for operating said switch whereof one is connected between terminals of the two sources of like polarity, and a variable resistance device connected in series with said last mentioned coil and adapted to limit without interrupting the flow of current therethrough.

3. In combination, two electric circuits, an electro-magnetic switch for connecting them, two coils for operating said switch whereof the first is connected in shunt across one of the circuits while the second is connected between the two circuits and is adapted, upon a flow of current therethrough in one direction to assist the first coil to close the switch, and variable resistance means for limiting without interrupting the flow of current through the second coil, to prevent the closing of the switch by current in the opposite direction therethrough.

4. In combination, two sources of electromotive force, means for connecting them in parallel relation, coils for operating said means whereof one is connected between terminals of the two sources of like polarity, and a resistance of high temperature coefficient connected in series with the last mentioned coil.

5. In combination, a source of substantially constant electro-motive-force, a second source of varying electro-motive-force, a switch for connecting them in parallel relation, coils for operating said switch whereof one is connected between terminals of the two sources of like polarity, and a resistance of high temperature coefficient connected in series with said last mentioned coil.

6. In combination, two electric circuits, an electro-magnetic switch for connecting them, two coils for operating said switch whereof one is connected in shunt across one of the circuits while the second is connected between the two circuits and is adapted, upon a flow of current therethrough in one direction to assist the first coil to close the switch, and a resistance of high temperature coefficient connected in series with the second coil.

7. In combination, two sources of electromotive-force, a switch for connecting them in parallel relation, coils for determining the operation of the switch, whereof one is connected across one of the sources, and the other is connected between the two sources across the switch gap, and an automatically variable resistance connected in series with the last named coil and adapted to limit without interrupting the flow of current therethrough.

8. In combination, two electrical circuits, a switch for connecting them, coils for operating said switch whereof one is connected to the circuits on opposite sides of the switch and is adapted to determine the closing of the switch in response to the amount and direction of current through said coil, and an automatically variable resistance connected in series with the last named coil and adapted to limit without interrupting the flow of current therethrough.

9. In combination, two electrical circuits, a switch for connecting them, coils for determining the operation of the switch whereof one is connected to the circuits on opposite sides of the switch and is adapted to determine the closing of the switch in response to the amount and direction of current through said coil and a resistor whose resistance is variable in response to changes of current therethrough for limiting without interrupting the flow of current through the last mentioned coil.

10. In combination, two sources of electromotive-force, means for connecting them in parallel relation, coils for operating said means whereof one is connected between terminals of the two sources of like polarity, and variable resistance means for limiting to a certain value the flow of current through the last mentioned coil without interrupting said flow.

11. In combination, a source of substantially constant electro-motive-force, a second source of varying electro-motive-force, a switch for connecting them in parallel relation, coils for operating said switch whereof one is connected between terminals of the two sources of like polarity, and a device connected in series with said last mentioned coil and adapted to limit the flow of current therethrough to a certain value without interrupting said flow.

12. In combination, two electric circuits, an electro-magnetic switch for connecting them, two coils for operating said switch whereof the first is connected in shunt across one of the circuits while the second is connected between the two circuits and is adapted, upon a flow of current therethrough in one direction to assist the first coil to close the switch, and means for limiting to a certain value without interrupting the flow of current through the second coil, to prevent the closing of the switch by current in the opposite direction therethrough.

13. In combination, two sources of electromotive-force, a switch for connecting them in parallel relation, two coils for determining the closing of said switch whereof the first is connected across the terminals of one source, and whereof the second is connected between terminals of like polarity of the two sources and is adapted to develop greater excitation in proportion to the voltage impressed upon it than the first coil, and a resistance of high temperature coefficient connected in series with the second coil.

14. In combination, two sources of electromotive-force, a switch for connecting them in parallel relation, two coils for determining the closing of said switch whereof the first is connected across the terminals of one source, and whereof the second is connected between terminals of like polarity of the two sources and is adapted to develop greater excitation in proportion to the voltage impressed upon it than the first coil, and means for limiting to a certain value the flow of current through the second coil without interrupting said flow.

In testimony whereof I have hereunto signed my name.

JOSEPH LESTER WOODBRIDGE.

Witnesses:
F. G. BEETEM,
R. A. WHETSTONE, Jr.